No. 785,815. PATENTED MAR. 28, 1905.
G. E. MARTIN.
HARNESS PAD.
APPLICATION FILED DEC. 22, 1902.
2 SHEETS—SHEET 1.
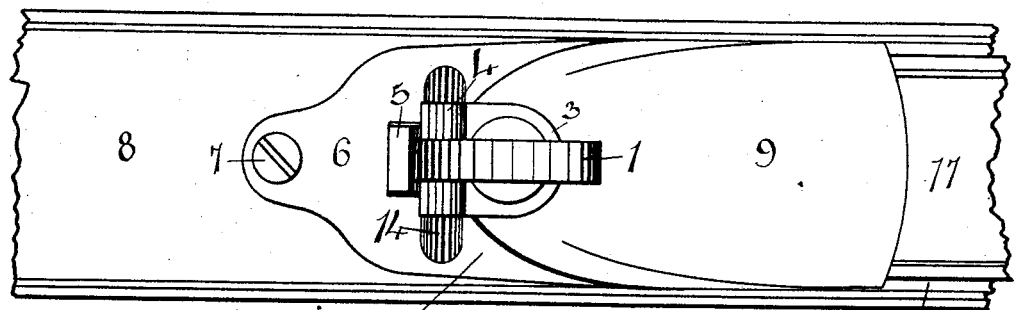
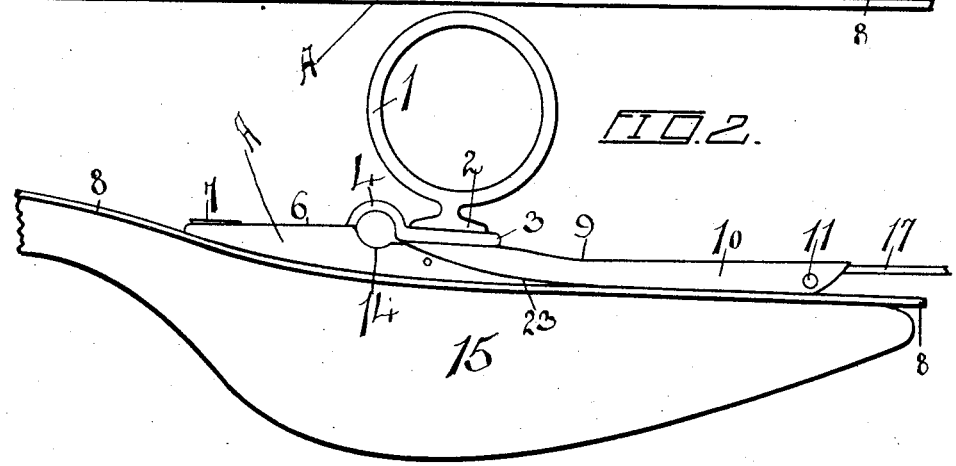
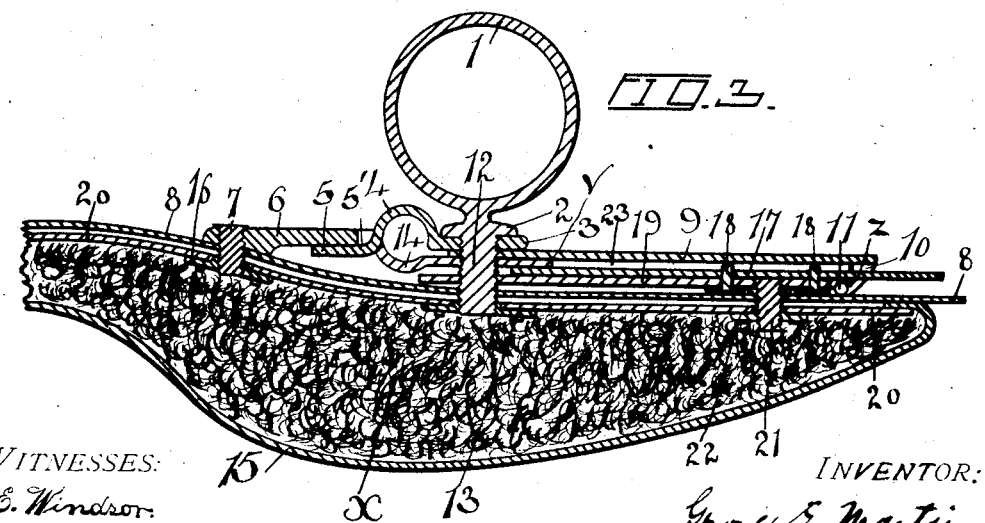
WITNESSES:
W. E. Windsor.
T. J. Larson.
INVENTOR:
George E. Martin
Geo. W. Ines, Attorney.

No. 785,815. PATENTED MAR. 28, 1905.
G. E. MARTIN.
HARNESS PAD.
APPLICATION FILED DEC. 22, 1902.

2 SHEETS—SHEET 2.

WITNESSES:
F. J. Larson
Grace E. Gatewood

INVENTOR:
George E. Martin
BY Geo. W. Sues.
Attorney.

No. 785,815. Patented March 28, 1905.

UNITED STATES PATENT OFFICE.

GEORGE E. MARTIN, OF CERESCO, NEBRASKA.

HARNESS-PAD.

SPECIFICATION forming part of Letters Patent No. 785,815, dated March 28, 1905.

Application filed December 22, 1902. Serial No. 136,188.

*To all whom it may concern:*

Be it known that I, GEORGE E. MARTIN, residing at Ceresco, in the county of Saunders and State of Nebraska, have invented certain useful Improvements in Harness-Pads; and I do hereby declare that the following is a full, clear, and exact description of the invention, such as will enable others skilled in the art to which it appertains to make and use the same, reference being had to the accompanying drawings, which form a part of this specification.

This invention relates to a harness-pad jockey, the object of my invention being to provide a neat, inexpensive, and positive means whereby the skirts of the harness-pad may be retained in place.

Figure 4:
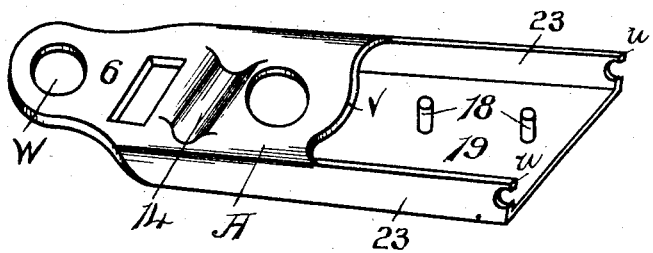
Figure 5:
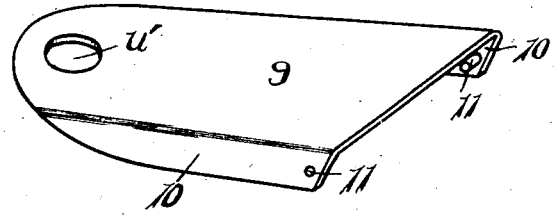
Figure 6:
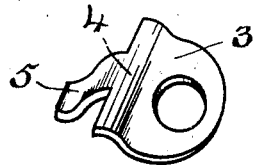

In the accompanying drawings I have shown in Figure 1 a broken top view of a harness-pad provided with my jockey. Fig. 2 shows a side view. Fig. 3 shows a central sectional view of my harness-pad jockey. Fig. 4 discloses a perspective view of my jockey. Fig. 5 shows a perspective view of the cap used in my invention, while Fig. 6 discloses a perspective view of the loop-plate as ordinarily used.

As ordinarily constructed the screws which retain the skirt also secure the jockey or holder that secures the skirt to the pad. This is found objectionable in that the screws as ordinarily secured are apt to work out, owing to the movement of the skirts, so that they become loose and often become entirely detached from the harness-pad.

In order to prevent the loosening of the screws employed in holding the jockey to the pad 20 and in order to provide a positive means whereby the skirt 17 may be retained in position, I construct the jockey or holder A of the usual conformation and provide the same with the usual forward ear portion 6, (shown in Figs. 1, 4, and 3,) which ear portion 6 is perforated in front, as is shown at $w$ in Fig. 4, to receive the screw 7, (more clearly shown in Fig. 3,) which screw passes through the ear portion of the jockey or holder and extends through the upper shield 8, thence through the top member 20 of the pad, and finally into a nut 16, secured below the pad member 20, as is clearly shown in Fig. 3. This jockey or holder A is provided below with the usual bottom portion 19, which is carried forward a suitable distance below the ear portion 6 of the jockey or holder, as is clearly disclosed in Fig. 3. Extending from the bottom 19 are two similar side portions 23, which extend upward a suitable distance and form flanges to prevent the lateral displacement of the skirts 17, as is disclosed in Fig. 1. In Fig. 4 I have shown at $v$ the end of the ear portion 6 with which the flanges 23 connect. These side portions 23 are also clearly shown in Fig. 4. This ear end 6 above is indented or grooved, as is shown at 14 in Fig. 2, while extending through the perforated bottom of the jockey or holder are the stems 18 of two ordinary rivets, which rivets are securely fastened to the bottom of the jockey and project upward a distance slightly in excess of the thickness of the skirt 17, as is shown in Figs. 3 and 4. The skirt 17 is suitably perforated so that it will fit over and be held upon the rivets 18. The flanges 23 project slightly beyond the bottom 19, as shown at $u$ in Fig. 4, to provide a seating, and below these projecting flange ends $u$ are held the lugs 11 of the cap 9 as used in my invention. This cap is preferably made of sheet metal and is provided with the downwardly-extending flanges 10, as is disclosed in Figs. 2 and 5, which work over and hide the flanges 23 of the jockey or holder A, as is disclosed in Fig. 2. In Fig. 3 one of the lugs 11 is disclosed as below the projecting flange end 23. This cap 9 is perforated, as shown at $u'$ in Fig. 5, as is also the ear 6, so that the screw 12 of the terret-ring 1 will readily pass through the perforation within the cap 9, the ear 6, as well as a registering perforation within the bottom 19, this screw 12 further being led through a perforation within the shield 8 and the top pad member 20, finally threading into the nut 13, (shown in Fig. 3,) secured below the pad member 20. However, before this terret-ring is secured I use the ordinary loop-plate 3, (shown in Fig. 6,) which is provided with the extension or tongue 5, adapted to work into the usual seating 5', as shown in Fig. 3, within the ear portion 6, this loop-plate being upwardly bowed, as is shown at 4 in Fig. 2, so as to form the usual terret-loop, as is also clearly shown in Figs. 2 and 6.

In order to securely fasten the jockey to the pad, I next provide the pad below its top member 20 with the nut 22, as is clearly shown in Fig. 3, while passing through an opening within the bottom 19 of the jockey or holder is the screw 21, the head of which screw is held within the bottom 19 of the jockey or holder, as is shown in Fig. 3, and passes through the shield 8, the upper member 20 being securely fastened within the nut 22. Now to secure this screw 21, which is apt to work loose, is the aim and object of this invention, and I accomplish this in that I place the skirt 17 above the head of the screw, this skirt 17, as shown in Fig. 3, resting upon the head of the screw and upon the bottom 19 of the jockey or holder, the skirt being held by means of the rivets 18, as is disclosed in Fig. 3. In order next to secure the skirt 17, which prevents the screw 21 from working upward, I secure the cap 9, held at the rear by means of the lugs 11 and in front by means of the screw 12, so that even if this screw 21 should work loose it could not work upward any farther than the bottom of the skirt 17, which would be stopped by means of the cap 9. By this arrangement I provide a simple construction which will insure the proper retention of the upper screw 21, which heretofore has been made to carry the load in that the skirts are usually held by this screw.

These jockeys are made of any suitable material.

Having thus described my said invention, what I claim as new, and desire to secure by United States Letters Patent, is—

1. In a device of the character described, the combination of the following instrumentalities to wit: a holder provided with an upper perforated ear portion near one end, and a perforated bottom portion near the opposite end, a projecting pin extending from the bottom of said holder, flanges projecting upward from said holder, a perforated cap provided with inwardly-extending lugs, said lugs being adapted to work below the ends of said flanges, a pad, said holder being secured at the ear end to said pad, a nut secured to said pad, and a screw passing through the bottom of said holder and into the nut secured to said pad.

2. The combination with a suitable harness-pad, of a holder secured to said pad, said holder being provided near one end with a perforated ear, intermediately with an opening, and at the remaining end with upwardly-extending flanges, a screw passing through aforesaid perforated ear and entering said pad, a second screw passing through the bottom of said holder and being suitably secured to aforesaid pad, a pin extending upward from the bottom of said holder, a cap provided with an opening registering with aforesaid intermediate opening, lugs secured to said cap adapted to work below aforesaid flanges, and a screw-provided terret-ring adapted to pass through said cap, holder, and adapted to thread into aforesaid pad, all arranged substantially as and for the purpose set forth.

In testimony whereof I affix my signature in presence of two witnesses.

GEORGE E. MARTIN.

Witnesses:
H. LEAL,
G. S. HELTMAN.